United States Patent
Harrison et al.

(10) Patent No.: US 6,215,420 B1
(45) Date of Patent: Apr. 10, 2001

(54) KEYBOARD (I)

(75) Inventors: Robert G. Harrison; Daniel W. Knodle, both of Seattle, WA (US); Gary M. Bang, Chandler, AZ (US)

(73) Assignee: Coach Master Int'l Corp., Seattle, WA (US)

( * ) Notice: Subject to any disclaimer, the term of this patent is extended or adjusted under 35 U.S.C. 154(b) by 0 days.

(21) Appl. No.: 09/466,103

(22) Filed: Dec. 17, 1999

Related U.S. Application Data (60) Provisional application No. 60/115,006, filed on Jan. 6, 1999.

(51) Int. Cl.[7] ................................................. H03M 11/00
(52) U.S. Cl. .................... 341/22; 345/168; 200/302.1; 200/302.2; 200/302.3; 341/20
(58) Field of Search ................... 341/20, 22; 200/302.1, 200/302.2, 302.3, 303, 304; 359/194.1; 345/168

(56) References Cited

U.S. PATENT DOCUMENTS

| | | | |
|---|---|---|---|
| 4,644,326 | * 2/1987 | Villalobos | 341/20 |
| 4,980,522 | * 12/1990 | Murakami | 200/5 |
| 5,243,430 | * 9/1993 | Emmons | 358/194.1 |
| 5,386,084 | * 1/1995 | Risko | 174/52.3 |
| 5,459,461 | * 10/1995 | Crowley | 341/22 |
| 5,644,338 | * 7/1997 | Bowen | 345/168 |
| 5,666,112 | * 9/1997 | Crowley | 341/22 |
| 5,704,467 | * 1/1998 | Jarvis | 200/512 |
| 5,742,241 | * 4/1998 | Crowley | 341/22 |
| 5,793,359 | * 8/1998 | Ushikubo | 345/169 |
| 5,861,822 | * 1/1999 | Park | 341/22 |
| 5,940,015 | * 8/1999 | Thornton | 341/20 |
| 6,052,071 | * 4/2000 | Crowley | 341/22 |
| 6,054,939 | * 4/2000 | Wei | 341/20 |

\* cited by examiner

*Primary Examiner*—Michael Horabik
*Assistant Examiner*—Albert K. Wong
(74) *Attorney, Agent, or Firm*—Miller Nash LLP

(57) ABSTRACT

Keyboards with a construction which isolates the interior of the device from water and other deleterious substances in the ambient surroundings. The keyboard also has the capability of transmitting to a second device, upon activation of a key, a coded, preferably infrared (IR) signal uniquely corresponding to the key which is activated.

8 Claims, 12 Drawing Sheets

KEYBOARD (I)

RELATED APPLICATION

This application is a continuation of Provisional application 60/115,006, filed on Jan. 6, 1999.

TECHNICAL FIELD OF THE INVENTION

The present invention relates to keyboards and, more particularly, to novel, improved keyboards so constructed that water and other foreign substances cannot penetrate to the keyboard interior.

BACKGROUND OF THE INVENTION

Disclosed in copending U.S. patent application No. 09/046,947 are appliances with a mode of operation which allows the appliance user to log onto the Internet. Particularly in the composition of e-mail messages, a keyboard type input device is advantageous, if not essential, to make e-mail messaging practical.

Appliances of the character described in the preceding paragraph are designed so that they can be used in environments—such as a kitchen—where water and other foreign substances are present. For a keyboard to be usable in such environments, exclusion of water and other foreign substances from the keyboard interior is needed. Otherwise water and/or other foreign substances might penetrate to the interior of the device and damage, if not totally ruin, internal components of the device.

SUMMARY OF THE INVENTION

There have now been invented and disclosed herein certain new and novel keyboards which have the requisite impermeability to foreign material desired for applications where exposure to water and/or other foreign matter can be expected.

These novel keyboards have a frame and a printed circuit board (PCB) mounted to the frame. An elastomeric keypad with character and function keys overlies the PCB. Pressing a key completes a corresponding electrical circuit on the PCB; the result is the transmission of an appropriate signal to the appliance or other unit serviced by the keyboard.

A base and a battery cover complete the configuration of the keyboard and isolate its internal components from the surrounding environment.

An integral peripheral portion of the elastomeric keypad seals the gap between the keypad and the base of the keyboard unit. Isolation of the keyboard interior from the ambient surroundings is completed by two seals or gaskets. One gasket seals the gap between the base and the battery cover. The second gasket keeps water and/or other foreign material from leaking through an opening in the battery cover. This opening accommodates a fastener which removably secures the battery cover in place.

The resistance of the keyboard to penetration by foreign substances is materially enhanced by virtue of there being no openings for keys through which foreign substances might reach the interior of the keyboard. This elimination of key-accommodating openings also contributes to cost effectiveness by eliminating the costs of sealing those openings.

In addition to their impenetrability, the novel keyboards disclosed herein have the advantage of being simple, rigid, lightweight, and manufacturable at low cost.

The modest cost of the keyboards disclosed herein is in part attributable to electronics which translate a keystroke into a coded signal that controls the operation of an appliance or other unit which the keyboard serves. This circuitry includes a column and row matrix of switches matched to the keyboard keys, an array of shift registers, and a microcontroller. When a key is activated, the corresponding switch is closed, and the microcontroller acquires the information that uniquely identifies a particular key (by column and row). From this information, the microcontroller and ancillary components generate a train of digital pulses uniquely identifying the key that was activated.

The encoded signals are preferably transmitted to the associated appliance at an infrared (IR) frequency. This eliminates the need for a connecting cable and the disadvantages appurtenant to the use of a connecting cable. Also, the use of a signal in the IR range makes the orientation of the keyboard relative to the unit it serves much less critical.

Infrared (IR) transmitters are preferably located at both ends and at the back side of the keyboard. This makes the keyboard omni-directional; that is, the combination of an IR signal and multiple transmitters means that the signal can be transmitted to the appliance (or other unit) the keyboard serves generally irrespective of the orientation of the keyboard relative to the appliance.

Another novel feature of the keyboards disclosed herein is a set of communicating channels formed in the reverse (inner) side of the elastomeric keypad. When a key is depressed, the pressure in the confined space between the key and the PCB may increase to the extent that the keypad shifts relative to the PCB, making the keyboard inoperable. The channels in the keypad eliminate this problem by increasing the volume of the space into which air can flow, thereby making the key activation-associated pressure build-up so small as to be inconsequential.

If deemed necessary, shifting of the elastomeric keypad relative to the PCB can be also (or instead) eliminated by positively anchoring the keypad to the PCB.

Another important advantage of the invention, especially from the practical point-of-view, is that the external configuration of keyboards embodying its principles are free from nooks and crannies and consequently easy to clean. In fact, to this end, the keyboard can be immersed in water (or any other liquid cleaning medium), if desired.

Yet another important advantage of keyboards as disclosed herein is the elastomeric keypad is so configured that: (a) the character and functional keys are dished and guide a user's fingers into the correct positions on the keys, and (b) the keys provide tactile evidence to the user of a key having been activated.

This keyboard has the advantage over input devices such as the remote controls disclosed in the above cited '947 application that e-mail messages can be easily composed. That is a much slower and cumbersome task when a remote control is employed as, when using that device, a cursor has to be moved to a character and the character then clicked on to select the character. Also, a remote control with a full complement of letter, number, and reference keys would be perhaps impracticably large and bulky.

The important features, objects, and advantages of the present invention will be apparent to the reader from the foregoing and the appended claims and as the ensuing detailed description and discussion proceeds in conjunction with the accompanying drawing.

DETAILED DESCRIPTION OF THE INVENTION

Figure 1:
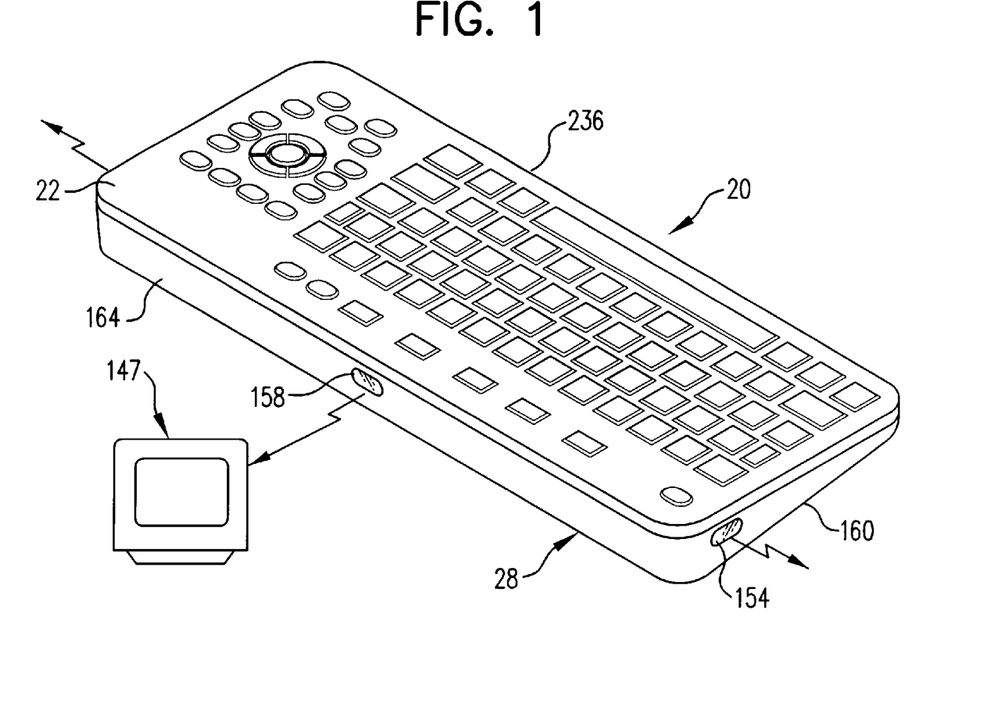
FIG. 1 is an isometric view of an impermeable (waterproof) keyboard constructed in accordance with and embodying the principles of the present invention.

Referring now to the drawings, FIG. 1 depicts a keyboard 20 constructed in accord with, and embodying, the principles of the present invention. The major mechanical components of keyboard 20, perhaps best shown in FIGS. 3A, 3B, and 5, include: an elastomeric keypad 22; a complementary PCB 24; a frame 26 on which PCB 24 is mounted; a base 28 which cooperates with keypad 22 and frame 26 to enclose PCB 24; LED's 30, 32, and 34 (see FIG. 10A) which function as infrared transmitters; a battery access cover 44; and a gasket 46 which seals the gap between base 28 and battery access cover 44.

Elastomeric keypad 22 includes both character keys and function keys (see FIG. 1A). The character keys—collectively identified by reference character 48—may be those constituting a conventional QWERTY key set. The function keys include conventional Tab, Caps Lock, Shift, Control, Alt, Escape, Delete, Space, Enter, and Backspace keys 49 . . . 64 as well as an On/Off key 66. Additional function keys of the illustrated, exemplary keypad 22 include mode switches 68, 70, 72, and 74 and a key block 76 which includes security/monitor, talk, and unlock buttons 78, 80, and 82. Mode keys 68, 70, 72, and 74 are employed to operate an appliance of the character disclosed in the '947 application in a selected one of its APPLIANCE, TV, INTERNET, and CD modes. The security/monitor, talk, and unlock buttons 78, 80, and 82 in set 76 are employed with an appliance of the same general character to enter a SECURITY mode of operation. The previously disclosed unit functions in each of the foregoing modes is described in the following table:

TABLE 1

| Mode | Function |
| --- | --- |
| ENTERTAINMENT | Allows the user to watch television |
| CD | Allows the user to play a conventional audio (or audio/visual) disk; in this mode the user can also play a disk of the character described in U.S. Pat. Nos. 5,724,102 and 5,801,784 to retrieve lessons on a particular subject or information on performing a task from the disk. |
| APPLIANCE | Gives the integrated module control over one or more appliances - as examples only, a kitchen range, refrigerator, central heating system, air conditioner, or central vacuuming system. Also, diagnostic information on the controlled appliance(s) may be gathered and made available on the display screen of the appliance and at a service or repair facility. |
| SECURITY/MONITOR | Allows one to visually identify and converse with a person at an entry way, and to unlock a door at the entry way, all from the location of the appliance; the appliance can also be used in this mode to monitor an area remote from the appliance - a baby's bedroom for example. |
| INTERNET | Allows a user to log onto and browse the Internet, send and receive e-mail messages, and to take advantage of the other opportunities which the Internet provides. |

Also found on keypad 22 is a set of navigation keys collectively identified by reference character 84.

The functions of these keys are described in above-cited application Ser. No. 09/046,947 except for REV and FWD keys 90 and 92 and PAUSE key 98. These keys are employed in a CD mode of operation of the appliance controlled by keyboard 20. They function in the same manner as conventional CD controls with the same designations.

Also found on keyboard 20 is a group 116 of control keys. These are VOLUME UP and VOLUME DOWN keys 118 and 120, MUTE key 122, and CHANNEL UP and CHANNEL DOWN keys 124 and 126. The functions of these keys are also described in application Ser. No. 09/046,947.

Figure 5:
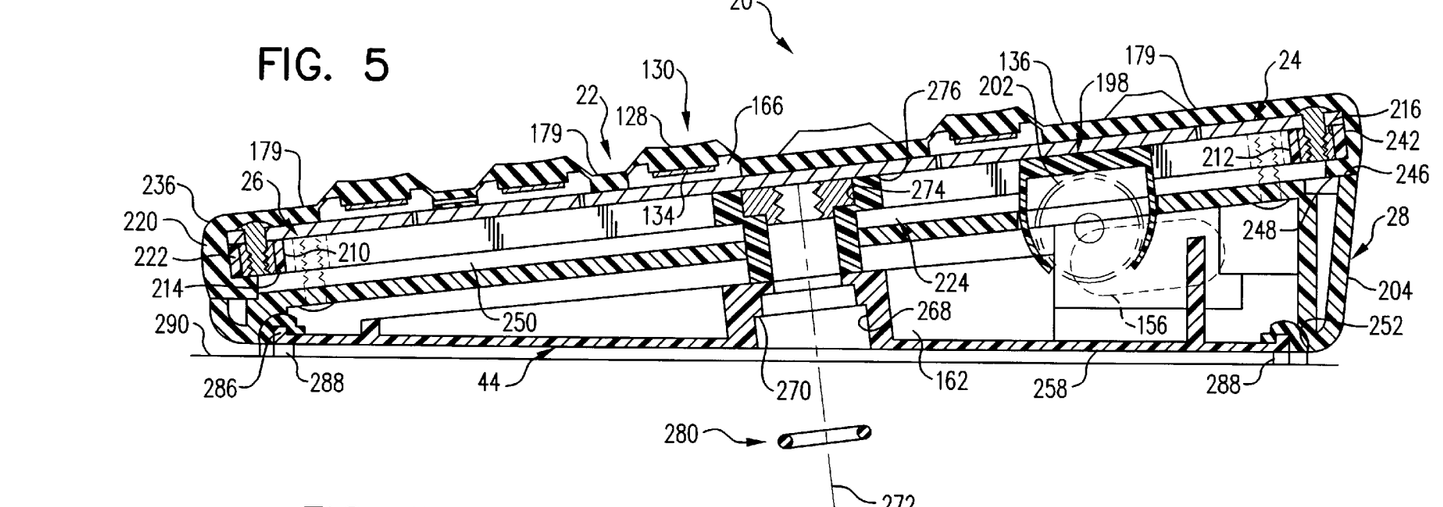
FIG. 5 is a transverse section through the FIG. 1 keyboard, taken generally along line 5—5 of FIG. 2.

As best shown in FIG. 5, the tops of the character and function keys just described have a concave, or dished, upper surface with the upper surface 128 of key 130 being representative. This promotes an advantageous "touch and feel" character of the keys, making it easier for a keyboard operator to position his fingers on a wanted key. The touch and feel characteristics of keyboard 20 are further promoted by constructing keypad 22 so that the several character and function keys emulate the familiar feel of a conventional keyboard, which indicates to the user that a key has been depressed far enough for activation. User friendliness may also promoted by color coding the keys to their functions.

As mentioned above, user friendliness can be promoted by color coding the keys of keyboard 20. A representative color scheme follows: The ON/OFF button is bright green, the mode selection buttons (TV, Internet, CD, Monitor, etc.) are light gray, the navigation buttons are dark gray and the MUTE button is yellow. This brings the user's eye to the ON/OFF button immediately upon approaching the keyboard. While the unit is in use the user's eye will be drawn to the mode selection and navigation buttons. If the user is interrupted or otherwise wants the sound turned off, the MUTE button can be easily found because it stands out with its bright yellow color.

Figure 2:
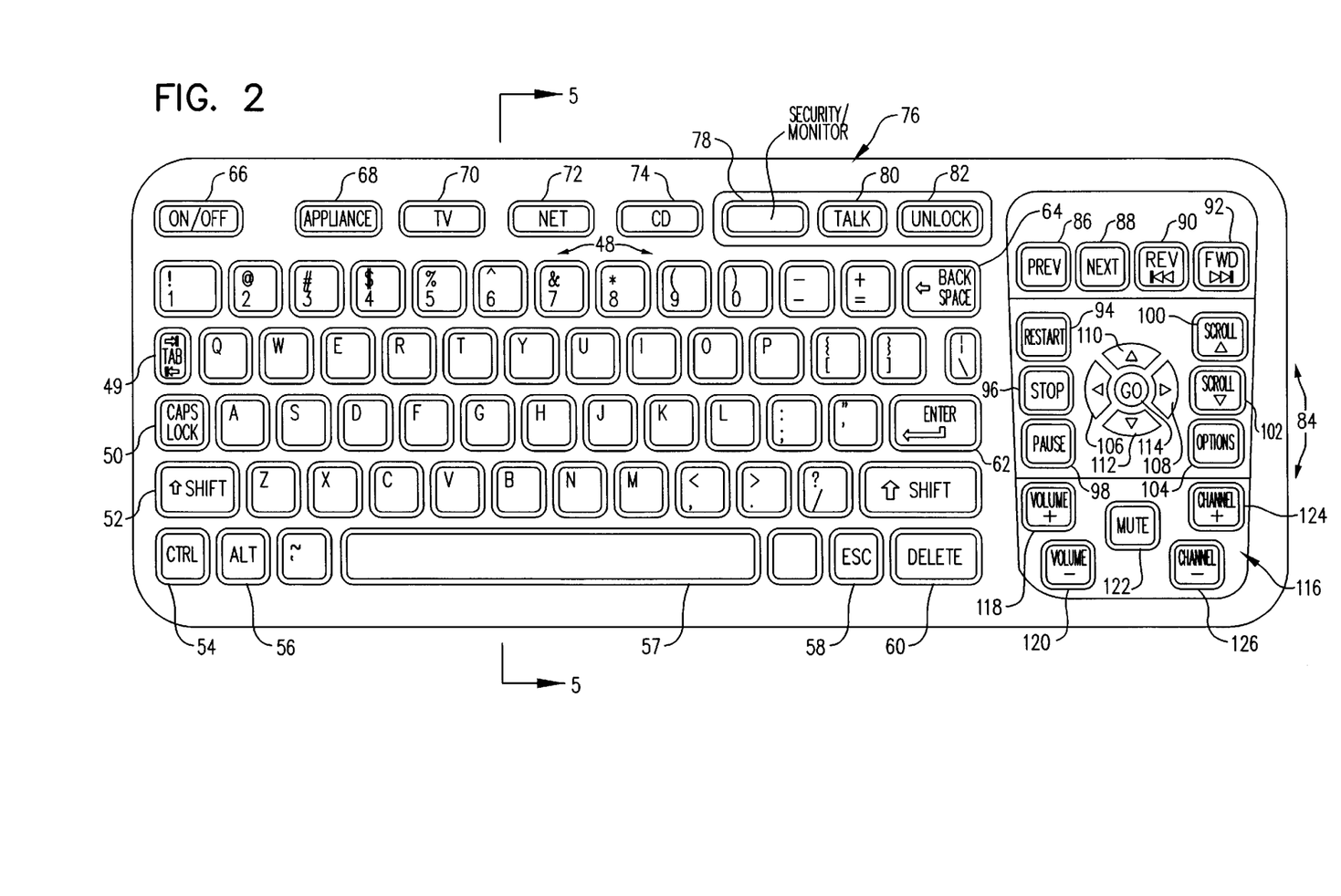
FIG. 2 is a top view of the FIG. 1 keyboard. This figure shows a set of character and function keys preferred if the keyboard is to be used to control an appliance of the character disclosed in the above-cited '947 application.

Turning now to FIGS. 2 and 5, an electrical switch contact is mounted on the inner or bottom side of each character and function key on keyboard 20. The contact 134 of switch S42 on the bottom of character key 130 ("g") is representative.

Figure 9:
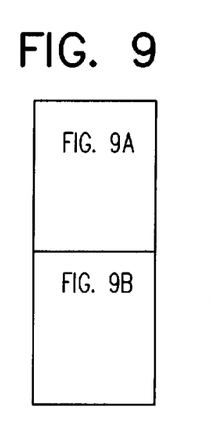
FIG. 9 shows the relationship between FIGS. 9A and 9B which, taken together, schematically show the electrical contacts of the key-associated switches; those are composed of contacts on the bottoms of the keys (FIG. 5) and associated traces on the PCB of the FIG. 1 keyboard; also shown in FIGS. 9A and 9B are leads connecting the traces to other components of the keyboard's operating system.
Figure 9A:
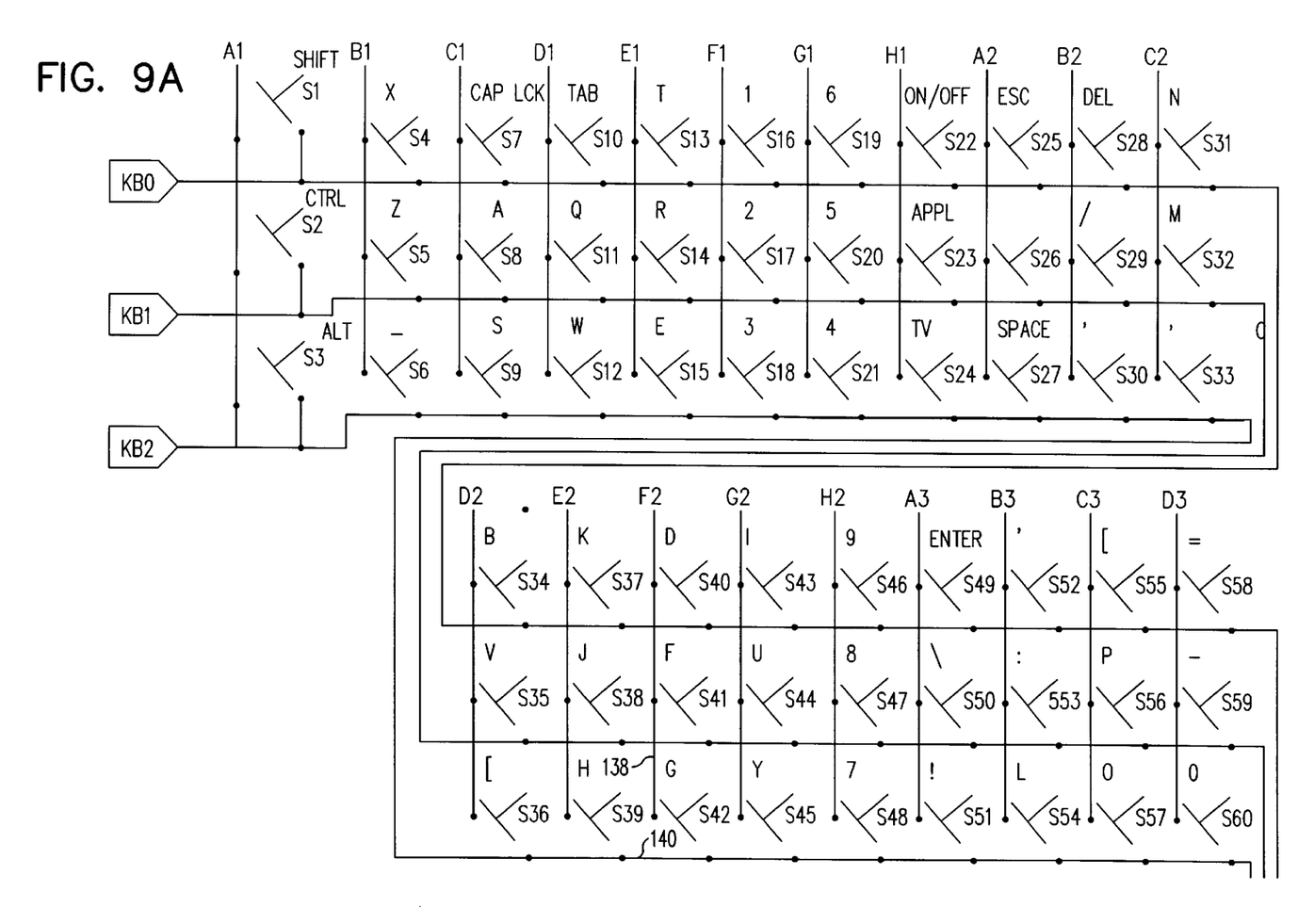

Located on the top or upper surface 136 of PCB 22 is a complementary set 137 of contacts (or traces) (see FIGS. 9A and 9B) with those traces of switch S42 identified by reference characters 138 and 140 in FIG. 9A being typical. When a key is depressed and its contact comes into engagement with the complementary traces on PCB 22, a coded electrical signal is generated by the circuitry shown in FIGS. 10A and 10B. This signal is unique to the character or function which has been selected. The LED transmitters 142, 144, and 146 (see FIG. 10A) operating in the infrared range transmit the coded signals to the appliance or apparatus identified by reference character 147 in FIG. 1 to which commands can be inputted by activating keys of keyboard 20. These LED's are mounted in cavities 148, 150, and 152 behind windows 154, 156, and 158 in the base 28 of keyboard 20.

One LED 142 propagates infrared energy through end wall 160 of keyboard base 28, a second LED 144 propagates energy through the opposite end wall 162 of the base, and the third LED 146 is located midway between the two end walls of the base in back wall 164. The same signal is propagated from each of the three LED's 142, 144, and 146. Consequently, and because the signals are in the IR range, a usable signal will be transmitted to the keyboard-controlled device essentially without regard to the angle through which the keyboard might be rotated relative to the infrared radiation receiver of the controlled device.

Figure 8:
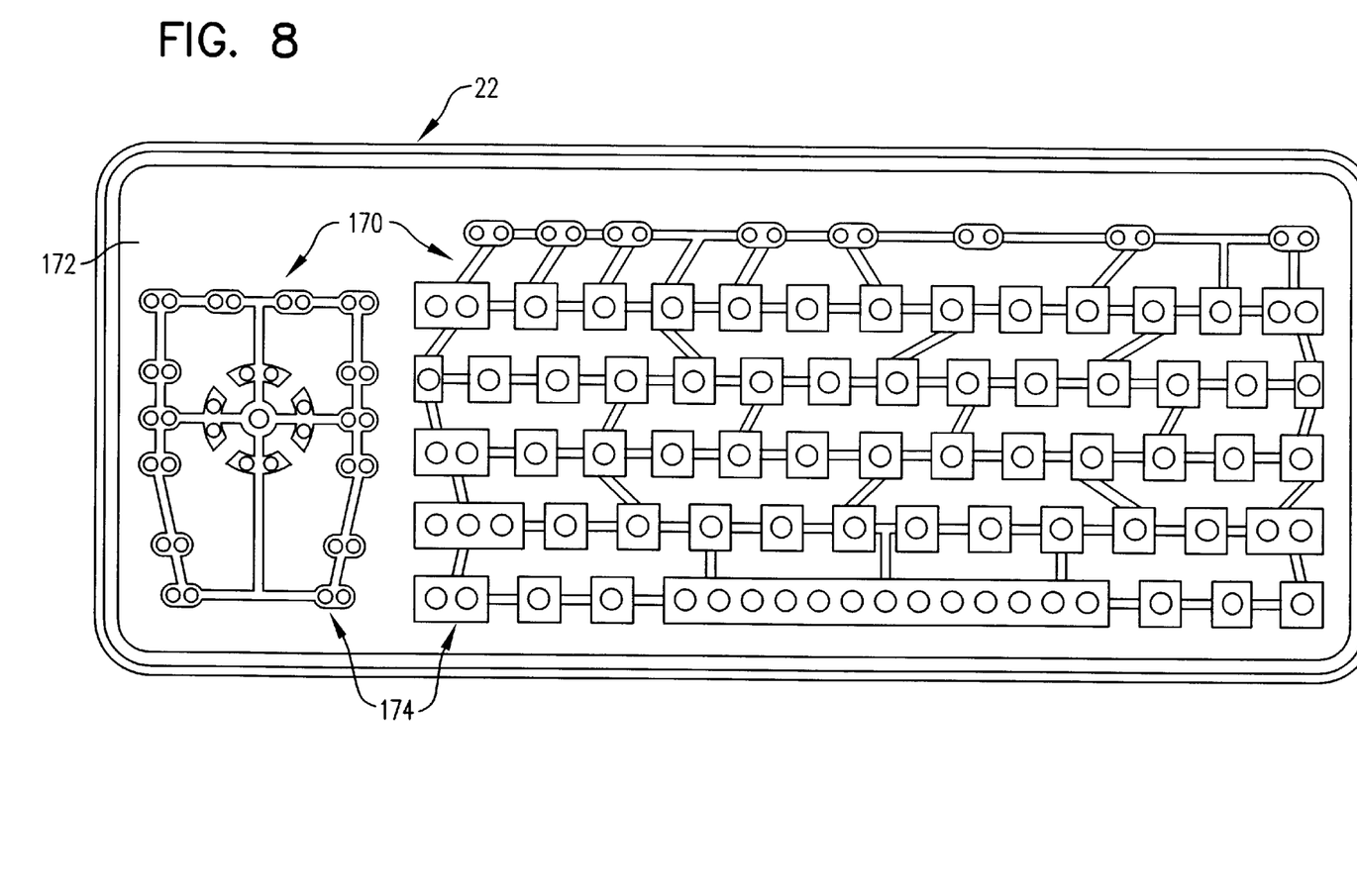
FIG. 8 is a bottom view of the elastomeric keypad of the FIG. 1 keyboard; this figure shows a set of communicating channels formed in the keypad to keep pressures built up when a key is depressed at an inconsequential level; this keeps the keypad from shifting relative to the associated and complementary PCB.

Pressing a character or function key of keypad 22 results in an increase of the air pressure in the space between that key and PCB 24 (a representative one of these spaces is identified in FIG. 5 by reference character 166). Experience has shown that this overpressure can be high enough to shift the keypad relative to the PCB 24. This is detrimental and can result in erratic electrical contact and in degradation of the touch and feel characteristics of the keyboard. In keyboard 20, this problem is simply and elegantly solved by forming a set of channels collectively identified by reference character 170 in FIG. 8 on the lower side 172 of keypad 22. These channels provide fluid communication between the keypad—PCB interspaces (collectively identified by reference character 174). Consequently, when a character or function key is depressed, air in the space below that key can flow into the adjacent and succeeding interspaces, increasing the volume into which the air can flow and limiting any increase in pressure to a level well below that at which keypad 22 might shift.

Figure 6:
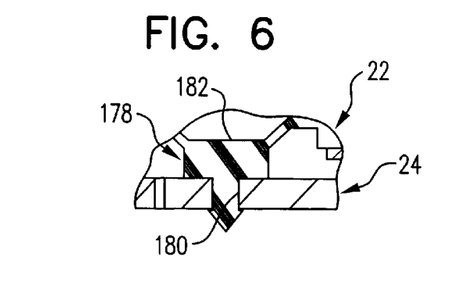
FIG. 6 is a fragmentary section showing how an elastomeric keypad of the FIG. 1 keyboard can be anchored and kept from shifting relative to a complementary PCB component of the keyboard.

Optionally, or in addition, the shifting of keypad 22 relative to PCB 24 can be prevented or enhanced by the retainer arrangement shown in FIG. 6. Arrow headed, integral plugs 178 are formed on the lower sides of keypad segments which are located between the various keys of keyboard 20 and physically contact the PCB (see reference character 179 in FIG. 5). These plugs are designed to fit through complementary apertures 180 in PCB 24. The head 182 of the plug then positively locks the PCB-contacting segment 179 from which it depends to the PCB.

Figure 7:
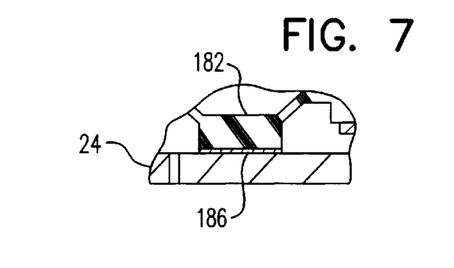
FIG. 7 is a fragmentary section showing yet another technique for anchoring the elastomeric keypad of the FIG. 1 keyboard to the PCB and thereby keeping it from shifting.

Alternatively, the keypad can be adhesively attached to the PCB. This arrangement is shown in FIG. 7 in which the adhesive is identified by reference character 186.

Figure 3:
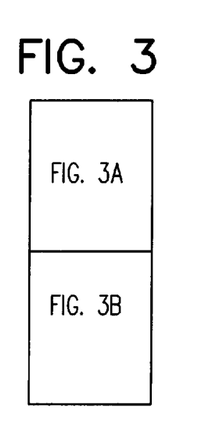
FIG. 3 shows the relationship between FIGS. 3A and 3B which, taken together, constitute an exploded view of the FIG. 1 keyboard.
Figure 3A:
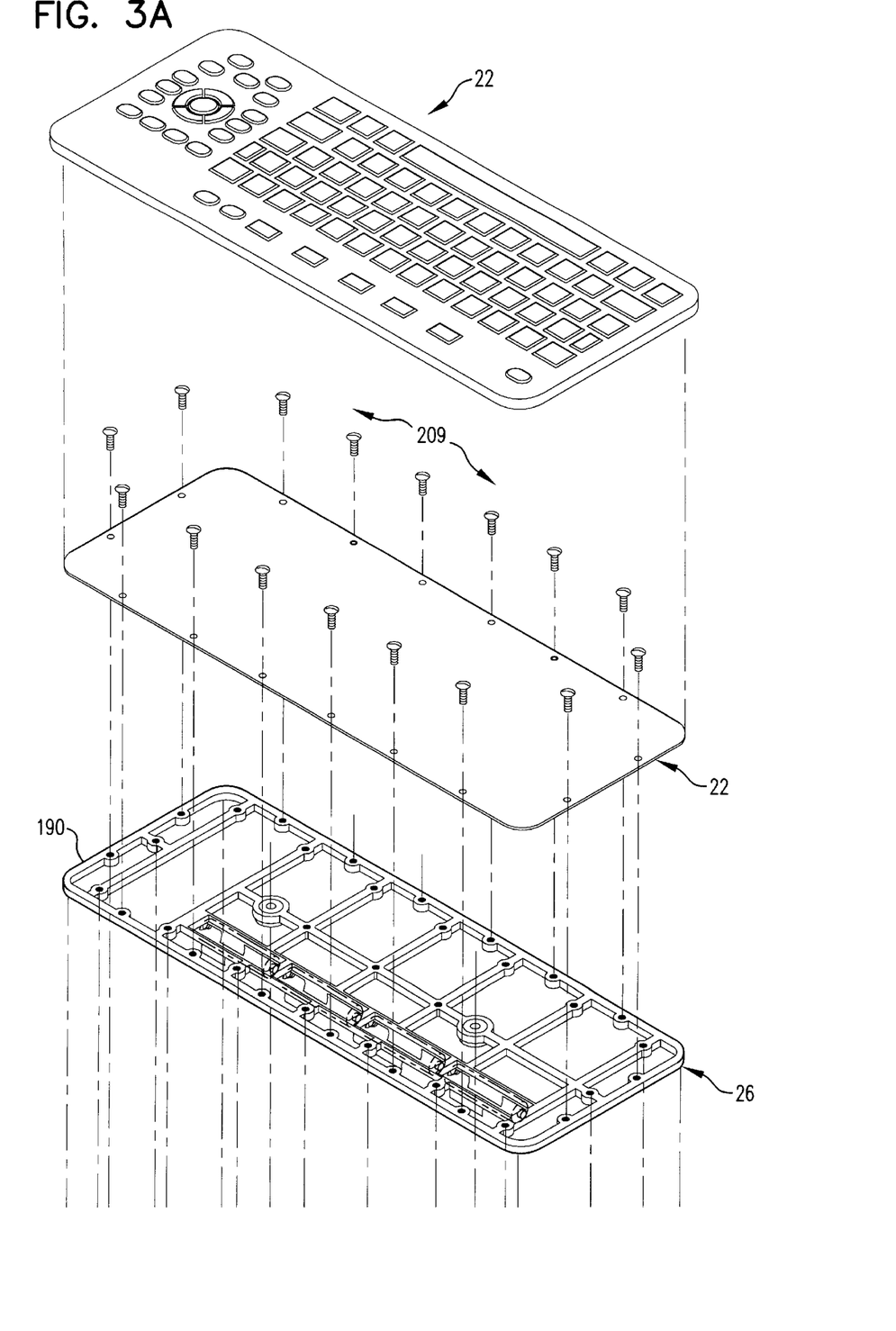
Figure 4:
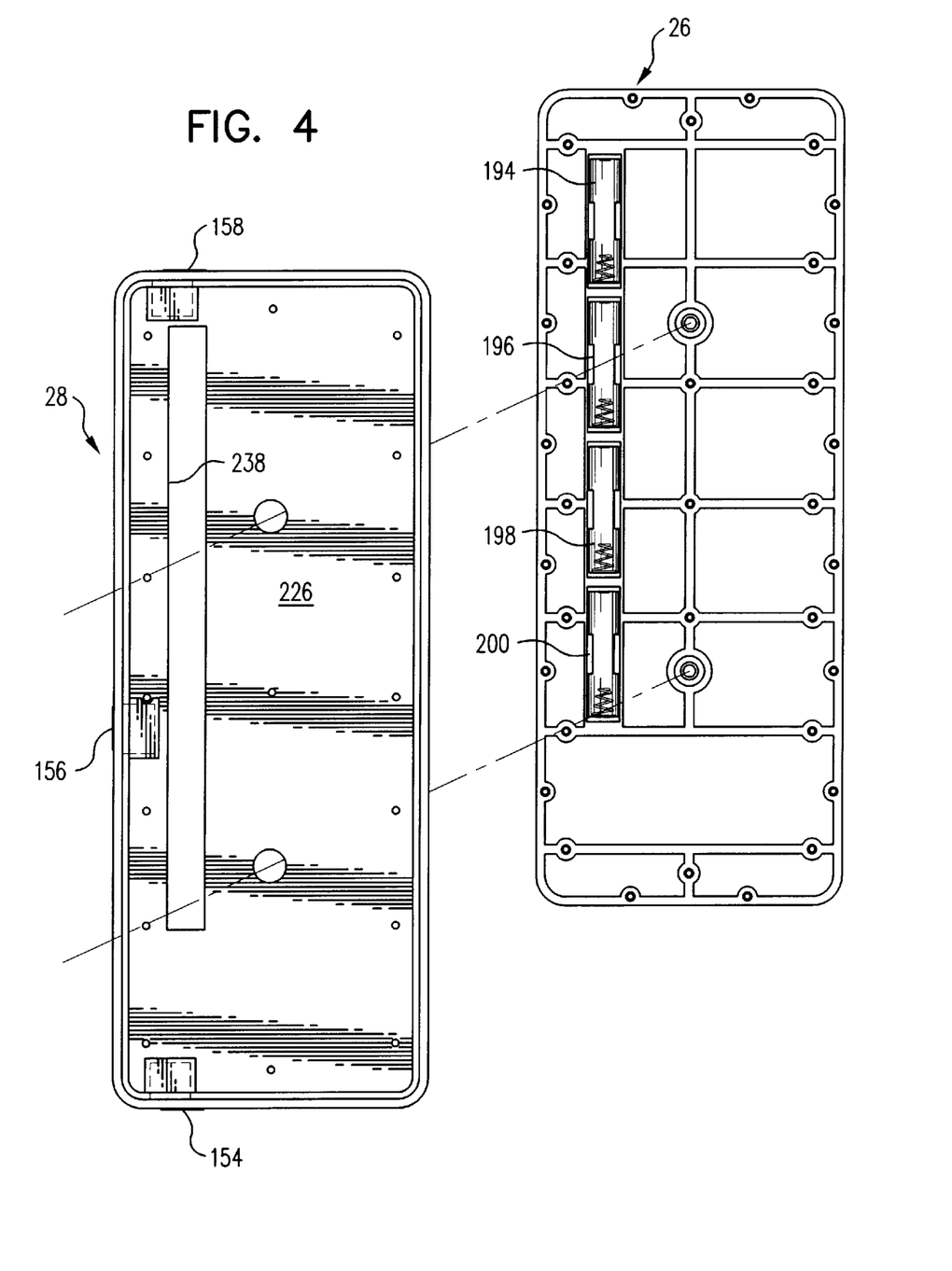
FIG. 4 is an exploded view of a keyboard frame and a keyboard base, looking at the lower sides of those components.

Referring now to FIGS. 3A, 4, and 5, the frame 26 keyboard of 20 includes a flat plate 188 of the same size and configuration as PCB 24. Rigidity is added to plate 188 by integral stiffeners. In the herein disclosed embodiments of the invention, the stiffeners are an integral peripheral rim 190 and internal, also integral ribs collectively identified by reference character 192.

Also incorporated in frame 26 are integral battery holders 194, 196, 198, and 200 (see FIG. 4). The battery holders are aligned along the rear edge 204 of the frame and include the customary contacts engageable by the positive and negative terminals of the batteries loaded into these battery holders. One of these batteries is shown in phantom lines in FIG. 5 and identified by reference character 202.

PCB 24 is fastened to frame 26 by screws which extend into internally threaded fittings. These fittings are located in apertures formed in the peripheral rim 190 and internal ribs 192 of frame 26. The screws are collectively identified by reference character 209 in FIG. 3A. Two of the inserts are identified by reference characters 210 and 212 in FIG. 5, and reference characters 214 and 216 identify the apertures in which the fittings are located.

As is best shown in FIG. 5, keypad 22 has an integral, depending flange 220 which extends completely around the keypad. This flange has an L-shaped configuration, which defines an inwardly directed recess 222. After PCB 24 and frame 26 have been fastened together, the resulting PCB/frame assembly 224 is assembled to keypad 22 with the edges of assembly 224 in recess 22 and the segments 179 of the keypad in contact with the keypad, PCB/frame unit 201 (FIG. 3A). Upon the subsequent assembly of keyboard base 28, the PCB 24, the components mounted on the PCB, the batteries such as battery 202, battery holders 194 . . . 200, and the contacts such as 134 on the bottoms of the: (a) character keys in QWERTY key set 48 and (b) function keys 49 . . . 74, and 78 . . . 114, and 118 . . . 126 are isolated from the ambient surroundings in a manner that keeps water and other foreign materials from reaching these electrical components.

Figure 3B:
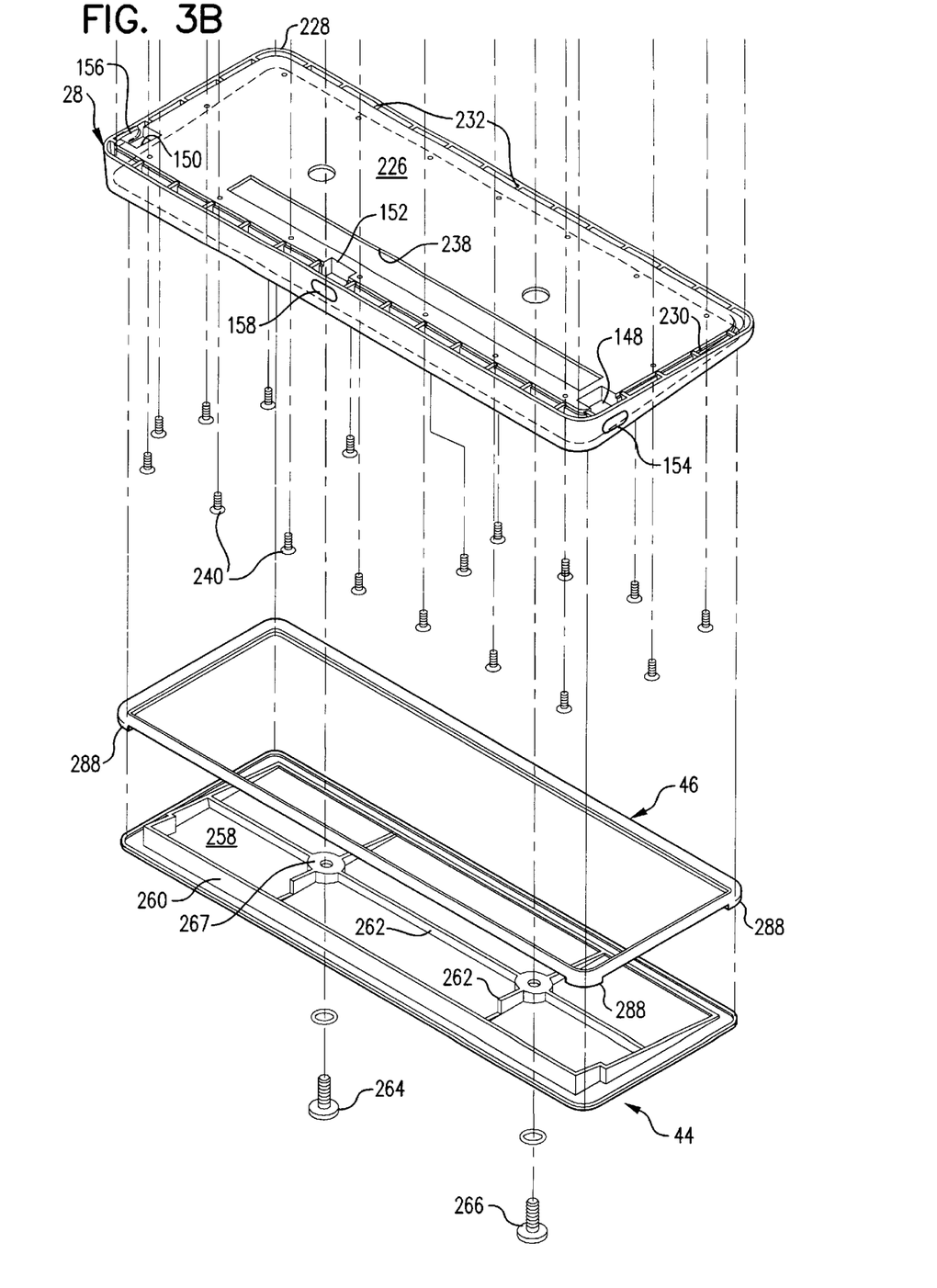

Referring now to FIGS. 3B, 4, and 5, the base 28 of keyboard 22 includes a flat plate 226, an integral outer wall, 228, and an also integral inner wall 230. Rigidity is provided by ribs which are integral with the plate 226 and two side walls 228 and 230 of base 28. These ribs are collectively identified by reference character 232 in FIG. 3B.

The outer and inner walls 228 and 230 of base 28 taper from the rear side 164 of keyboard 22 to the front side 236 of the keyboard. This results in keypad 22 being inclined for ease of use.

There is an elongated slot 238 in the plate 226 of base 28 near the rear side 164 of keyboard 20. Battery holders 194 . . . 200 extend downwardly through slot 236, furnishing the access to the battery holders needed for installation and replacement of the batteries.

Keyboard base 28 is fastened by screws 240 to the assembly 224 of PCB 24 and frame 26 after this assembly has been installed in the depending flange segment 220 of keypad 22. These screws are threaded into complementary fittings 242 with the latter being located in the peripheral rim 190 and ribs 192 of keyboard frame 26.

As screws 240 are tightened, the upper edge 246 of keyboard base outer wall 228 is pressed against the inwardly extending lip 248 at the bottom end of keypad flange 220.

This isolates the interior 250 of keyboard 20 and the components housed in that space from the ambient surroundings, preventing water and other foreign material from reaching the interior of keyboard 20 and perhaps damaging internal keyboard components.

Access to battery holders 194 . . . 200 is gained through an opening 252 (see FIG. 5) in the keyboard base 28. Removable battery cover 44 spans this opening, isolating the interior 250 of the keyboard from the ambient surroundings.

As shown in FIGS. 3B and 5, battery cover 44 has a flat bottom 258 with an integral rib 260 extending around its periphery. This flange adds rigidity to the battery cover as do internal, also integral ribs collectively identified by reference characters 262.

Battery cover 44 is secured in place toward the opposite ends of keyboard 20 by thumbscrews 264 and 266. Only the structure associated with screw 264 will be described herein as the structure associated with both screws is the same.

Referring then particularly to FIG. 5, battery cover 44 has an integral boss 267 located at the intersection of intersecting internal ribs 262. This boss has an internal recess 268 with a step 270. Located directly above recess 268 in keyboard frame 26 as indicated by centerline arrow 272 is a stepped recess 274 formed in an integral boss 276 of keyboard frame 26. In the stepped recess 274 is an internally threaded fitting 278.

Also employed in the installation of battery cover 44 is an o-ring seal 280.

To fasten battery cover 44 in place, o-ring seal 280 is installed in the aperture 268 through battery cover boss 267 and seated on the step 270 in that opening. Next, thumbscrew 264 is displaced through in seal 280 and through the passage 268 in boss 267 and then threaded into keyboard frame insert 278, clamping battery cover 44, seal 46, and seal 280 in place.

Seal 280 keeps water and other foreign material from penetrating to the interior 250 of keyboard thumbscrew 264. A second gap around the periphery 286 of the battery cover 44 is sealed by seal 46. This seal is trapped between that cover and the edge 287 of the opening 252 in base 28.

As is perhaps best shown in FIG. 4, integral, depending feet 288 are formed at the four corners of seal 46. These feet support keyboard 20 from the surface 290 on which the keyboard is rested. These feet also keep keyboard 24 from sliding on that surface.

Figure 9B:
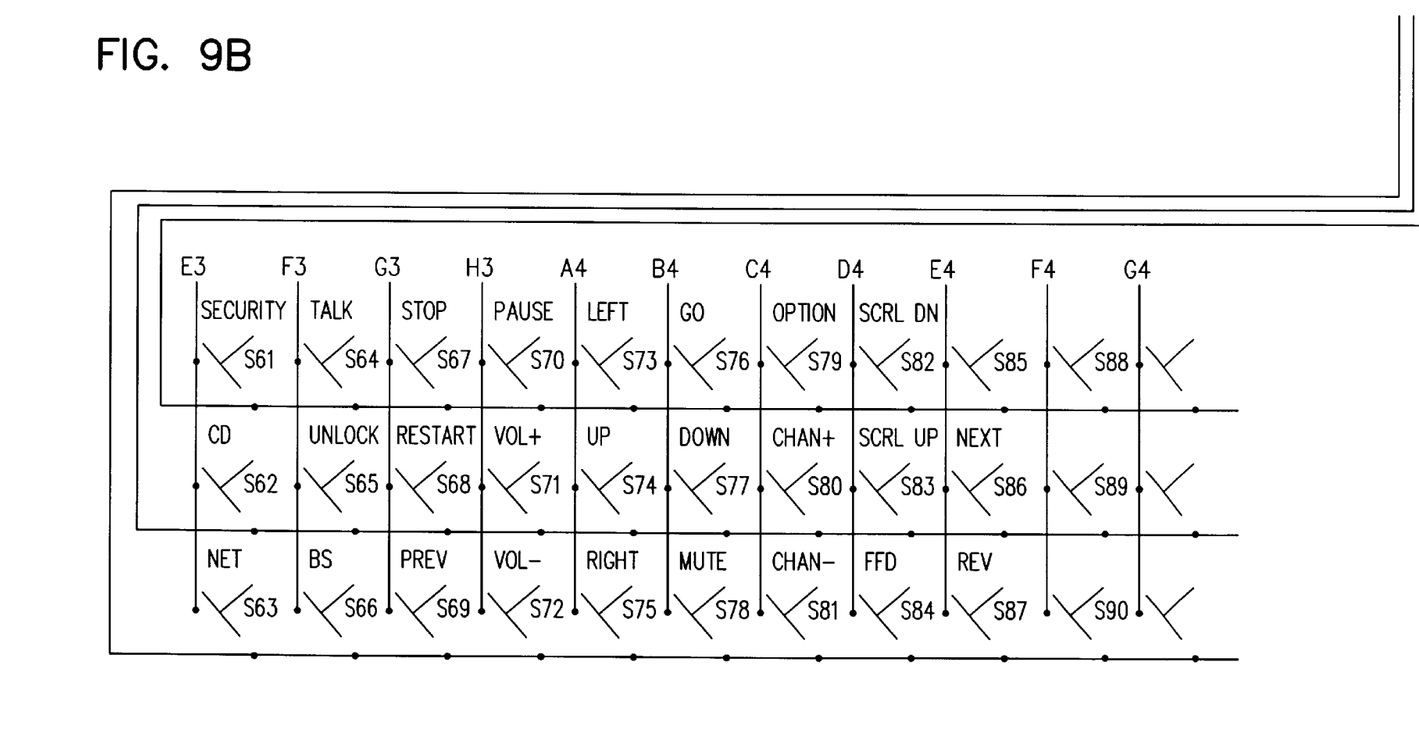

Referring next to FIGS. 9A and 9B, it was pointed out above that the activation of a user-activatable key of keyboard 20 (any one of the 87 keys 49 . . . 74, 78 . . . 114, or 18 . . . 126) results in a switch associated only with that key being closed and that this switch closure results in a signal unique to the activated key being generated and transmitted to the device 147 served by keyboard 20 (see FIG. 1). These 87 switches are identified in FIG. 9A and 9B by reference characters S1–S87.

As was also briefly discussed above, each of these switches is made up of: (a) two traces on PCB 24 which are normally electrically isolated from each other but, when a key is activated, can be bridged by a third, key-mounted element (a contact) of the switch. The contact is located on the bottom of the key with which the switch is associated.

Switch S42 with its contact 134 and traces 138 and 140 was described above. The other 86 switches have the same elements (two traces and a contact) as switch S42.

The trace 138 of switch S42 and the equivalent traces of the other 86 switches are connected to leads identified in FIGS. 9A and 9B by reference characters: A1–A3, B1–B3, C1–C3, D1–D3, E1–E3, F1–F3, G1–G3, and H1–H3. Trace 140 and its cconnected to leads KB0, KB1, and KB2.

Leads A1–H3 are generally referred to hereinafter as "column" leads and leads KB0, KB1, and KB2 are referred to as "row leads." The net result of these connections is to arrange switches S01 through S87 in a column and row matrix 300 in which the columns are represented by leads A1 . . . H3 and the rows by leads KB01, KB02, and KB03.

Column leads A1 . . . H4 are connected in groups of eight to shift registers 302, 304, 306, and 308; and leads KB0, KB1, and KB2 are connected to the input side of a programmable microcontroller 310.

The closing of representative switch S42 by pressing character key 130 causes lead KB2 to go to ground. This "wakes up" microcontroller 310 which scans the shift registers 302 . . . 308, looking for the column lead (F2) also grounded by the closing of switch S42. Once the grounded lead F2 is found, the microcontroller 310 has specifically identified the switch S42 that was closed by column (F2) and line (KB2). This results in the microcontroller so turning transistor 312 (FIG. 10A) on and off as to cause IR emitters 142, 144, and 146 to transmit the same coded, digital signal uniquely identifying the switch S42 and, consequently, the key 130 that was closed by the keyboard user. The device 147 served by keyboard 20 consequently receives and acts upon the command selected by activating key 130.

Figure 11:
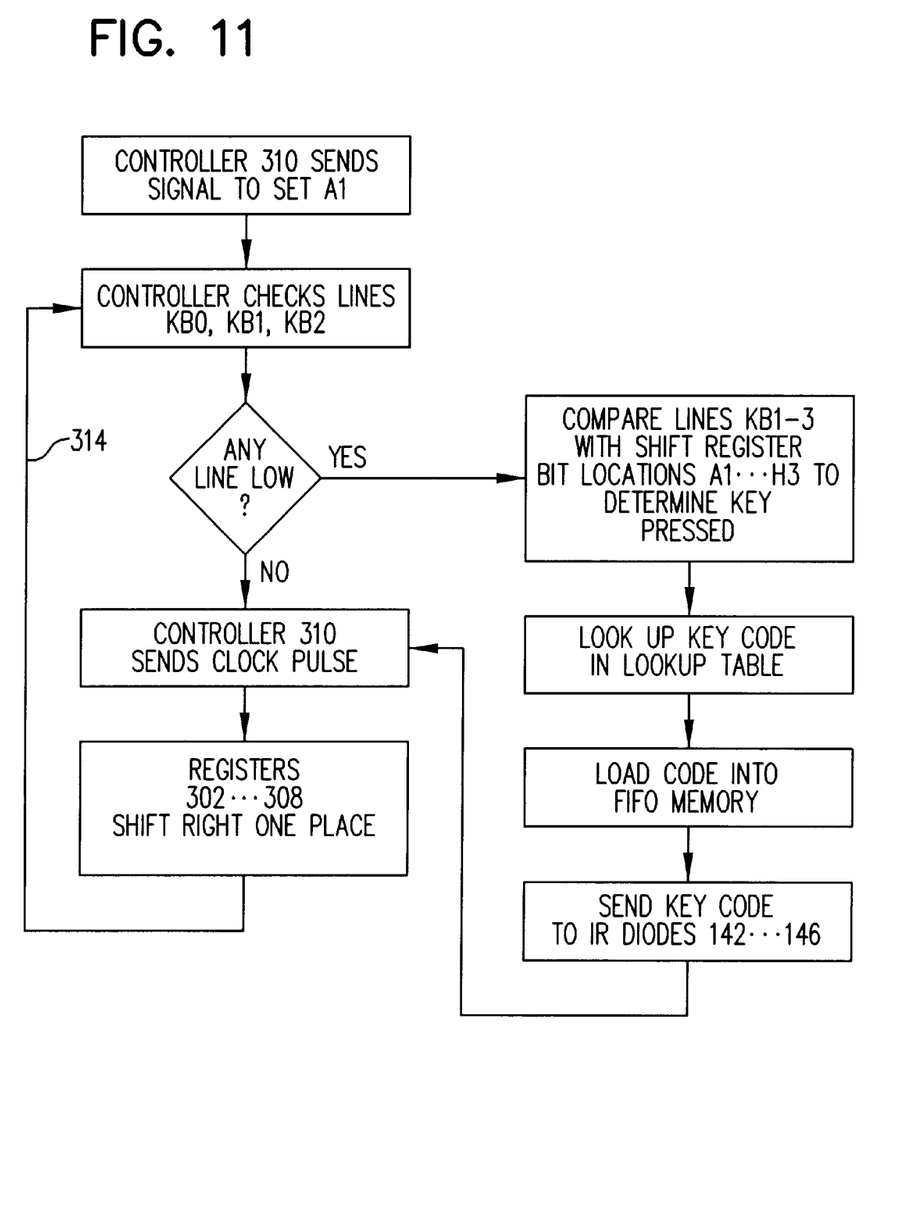
FIG. 11 is a flow diagram showing how a microcontroller incorporated in the keyboard detects a key that is pressed and causes the IR transmitter components of the keyboard to transmit an IR signal uniquely identifying the activated key.

The steps involved in generating and outputting a coded digital signal from keyboard 20 when a key is pressed are shown in the logic diagram of FIG. 11.

Turning then to that figure, controller 310 sends a signal to line A1 to set shift registers 302 . . . 308. The controller next checks the state of matrix row lines KB0, KB1, and KB2.

If none of these three lines is low, controller 310 sends a clock pulse to shift registers 302 . . . 308, which respond by shifting one bit to the right. As shown by line 312 in FIG. 11, the cycle is then repeated.

If controller 310 finds that one of the row lines KB0, KB1, and KB2 has gone low, it compares the KB lines with the eight bit locations in each of the shift registers 302, 304, 306, and 308, thereby determining which key of keyboard 20 was pressed or otherwise activated. Next, the digital code for the activated key is determined by controller 310 from a look-up table (not shown) and loaded into FIFO memory. From memory, this code is sent to IR transmitters 142, 144, and 146 by turning transistor 314 on and off as discussed above.

Figure 10:
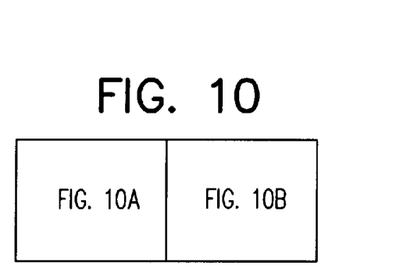
FIG. 10 shows the relationship between FIGS. 10A and 10B which, taken together, constitute a schematic diagram of the operating system components employed in the FIG. 1 keyboard to generate and transmit coded, digital, infrared signals as the keys of the FIG. 1 keyboard are pressed.
Figure 10A:
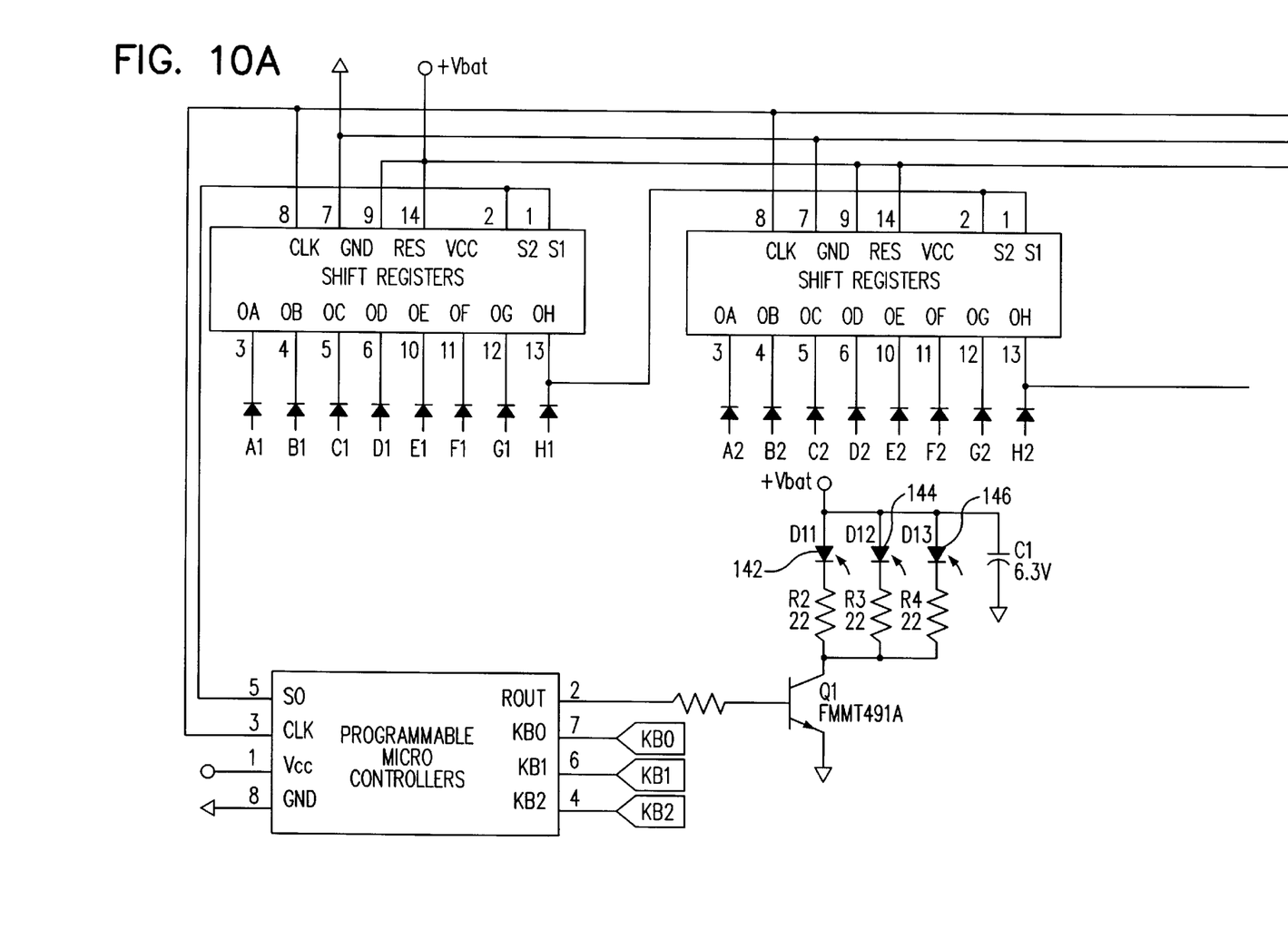
Figure 10B:
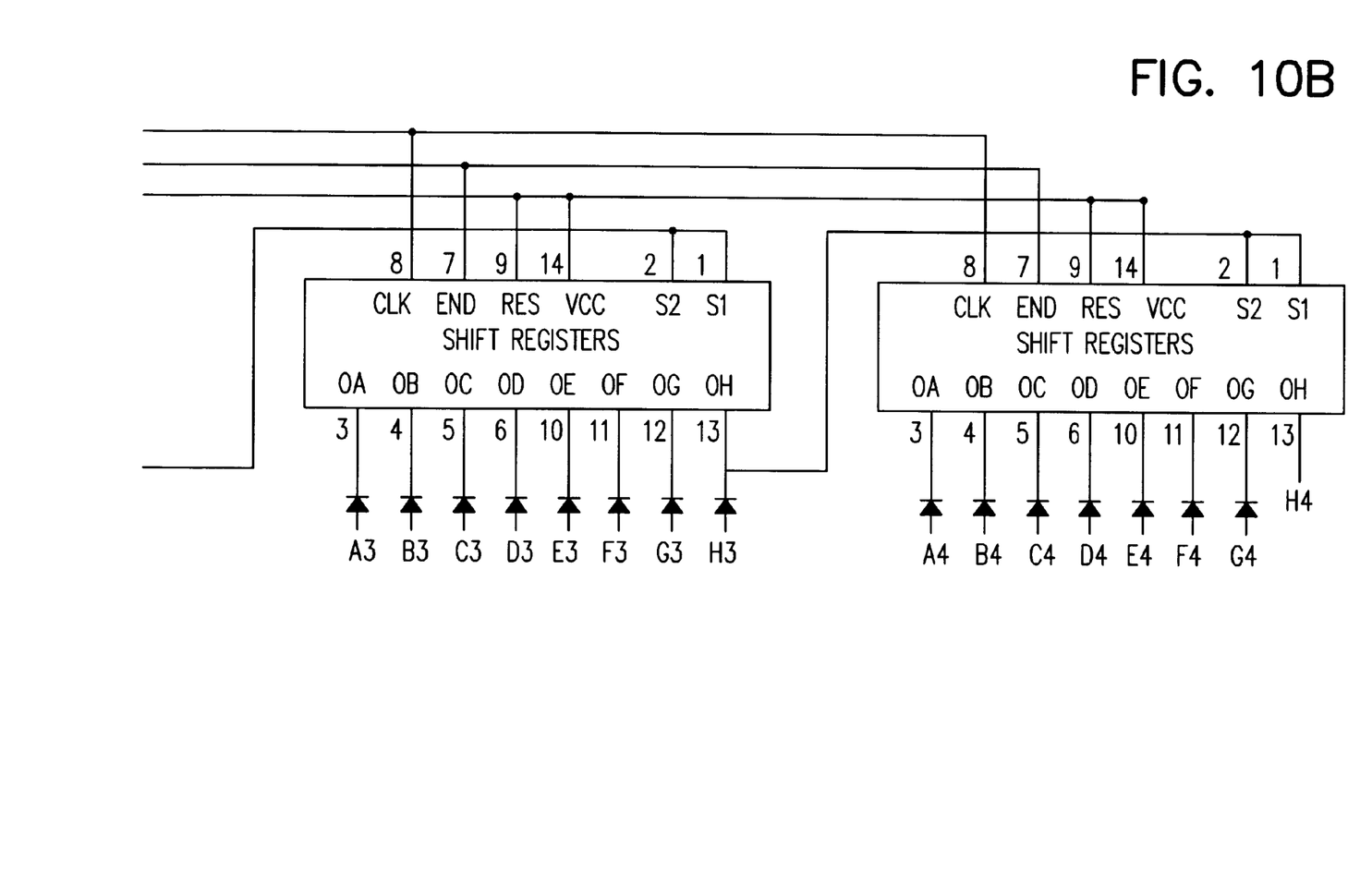

The FIG. 10 operating system functions in much the manner as just described when a combination of keys—for example, a letter key and a shift-key are pressed. In this case, the digital IR signal transmitted to module 147 is that for the upper case version of the user-selected letter.

The invention may be embodied in many forms without departing from the spirit or essential characteristics of the invention. The present embodiment is therefore to be considered in all respects as illustrative and not restrictive. The scope of the invention is indicated by the appended claims rather then by the foregoing description, and all changes which come within the meaning and range of equivalency of the claims are therefore intended to be embraced therein.

What is claimed is:

1. A keyboard which comprises:

a keypad;

a rigid circuit component; and a rigid base;

said keypad being an outermost, completely exposed component of the keyboard and comprising a set of elastomerically displaceable keys, said keypad being juxtaposed to the rigid circuit component and having portions between the keys that are supported by the rigid circuit component;

complementary contracts so associated with said keys and said rigid circuit component on a one-to-one basis that displacement of one of said keys results in the engagement of the contact associated with said key and the corresponding circuit component-associated contact as to enable the generation of a signal uniquely identifying the key that was displaced;

said keypad and said rigid base being so juxtaposed as to define a casing having an internal cavity;

said rigid circuit component being housed in said cavity;

said keyboard further comprising a sealing arrangement so constructed and configured as to keep fluids from penetrating into said cavity between said keypad and said base; and said keypad being free of openings and fabricated of a material such that fluids are kept from reaching said cavity through the keypad.

2. A keyboard as defined in claim 1 which comprises a frame for supporting components housed in said casing;

said frame and said base being separate components; and said frame being so fastened to said base as to locate and immobilize said frame in said casing.

3. A keyboard as defined in claim 1 wherein:

said keyboard casing has an elongated, parallelepipedal configuration and front, rear, and end wall elements;

there are windowed apertures in each of end wall elements and in said rear wall element;

the keyboard also has means for propagating the signal generated upon activation of a key to a remote location; and said signal propagating means comprises infrared radiation transmitters operable upon the activation of a key or combination of keys for simultaneous propagating through all of said windowed apertures an IR signal uniquely identifying the activated key or combination of keys.

4. A keyboard as defined in claim 1 in which said keypad is free of openings through which fluids could penetrate to the interior of the casing.

5. A keyboard as defined in claim 1 wherein there is an interconnected set of key-associated outlets and channels formed in and by said keypad and said rigid circuit component for relieving built-up pressure generated by the activation of one or a combination of said keys;

the key-associated outlets and channels being so related and configured that it is the pressure between the keypad and the rigid circuit component that is relieved when a key or combination of keys is depressed.

6. A keyboard as defined in claim 1 wherein said keypad has character keys for typing and mode keys which are utilizable to switch the operation of an appliance associated with said keyboard from one operating mode to another.

7. A keyboard as defined in claim 6 which comprises keys for moving a cursor about the screen of a display unit component of the appliance.

8. A keyboard as defined in claim 6 wherein said keys include navigation keys.

* * * * *